United States Patent [19]

Loveland et al.

[11] 4,046,067

[45] Sept. 6, 1977

[54] MACHINE FOR CUTTING PEARS INTO SEGMENTS

[75] Inventors: Malcolm W. Loveland, Orinda; Rudolph Matthews, Oakland, both of Calif.

[73] Assignee: Atlas Pacific Engineering Company, Emeryville, Calif.

[21] Appl. No.: 637,379

[22] Filed: Dec. 3, 1975

[51] Int. Cl.[2] ........................ A23N 7/08; A47J 17/00; B26D 4/00; B26D 11/00

[52] U.S. Cl. ........................................ 99/543; 99/545

[58] Field of Search ................ 99/537, 538, 543, 545; 83/431, 437

[56] References Cited

U.S. PATENT DOCUMENTS

| | | | |
|---|---|---|---|
| 2,187,075 | 1/1940 | Coons | 99/543 |
| 3,444,912 | 5/1969 | Blakewell | 99/543 |

*Primary Examiner*—Harvey C. Hornsby
*Assistant Examiner*—Robert Pous

[57] ABSTRACT

A machine is provided for splitting a pear which has been previously cored and peeled into two or more segments. The machine comprising a first spindle upon which the pear is cored and peeled after which the pear is pushed by a pusher means on to a second coaxial movable spindle which pivots away from the axis of the first spindle and into alignment with a stationary knife where a second pusher pushes the pear off of the second spindle and through the knife thereby cutting the pear into segments while the first spindle is accepting a second pear.

7 Claims, 18 Drawing Figures

MACHINE FOR CUTTING PEARS INTO SEGMENTS

SUMMARY OF THE INVENTION

It is in general the broad object of the present invention to provide an addition to a well-known type of pear coring and peeling machine for cutting the cored and peeled whole pear into two or more segments instead of only into two segments.

In the prior Coons et al U.S. Pat. No. 3,018,179 and the prior Harrer et al U.S. Pat. No. 3,055,408, a machine is disclosed for stem coring, seed cell coring, peeling, stem end and blossom end coring and optionally splitting a pear into two halves while Loveland U.S. Pat. No. 3,058,502 discloses a rotary peeling device for pears. The device of the present invention provides an adjunct to these machines wherein, instead of splitting the pear into two halves, the pear is removed from the spindle on which it has been cored and peeled to another spindle which serves as support for the pear while it is transferred to and is forced through the splitting knife cutting the pear into two or more segments.

BRIEF DESCRIPTION OF THE DRAWINGS

FIG. 4 particularly showing the auxiliary spindle in relation to the splitting knife, while FIG. 5 is an end view of the splitting knife, and FIG. 6 is a view showing the pusher for forcing a pear along the auxiliary spindle.

DESCRIPTION OF THE PREFERRED EMBODIMENT

Figure 1:
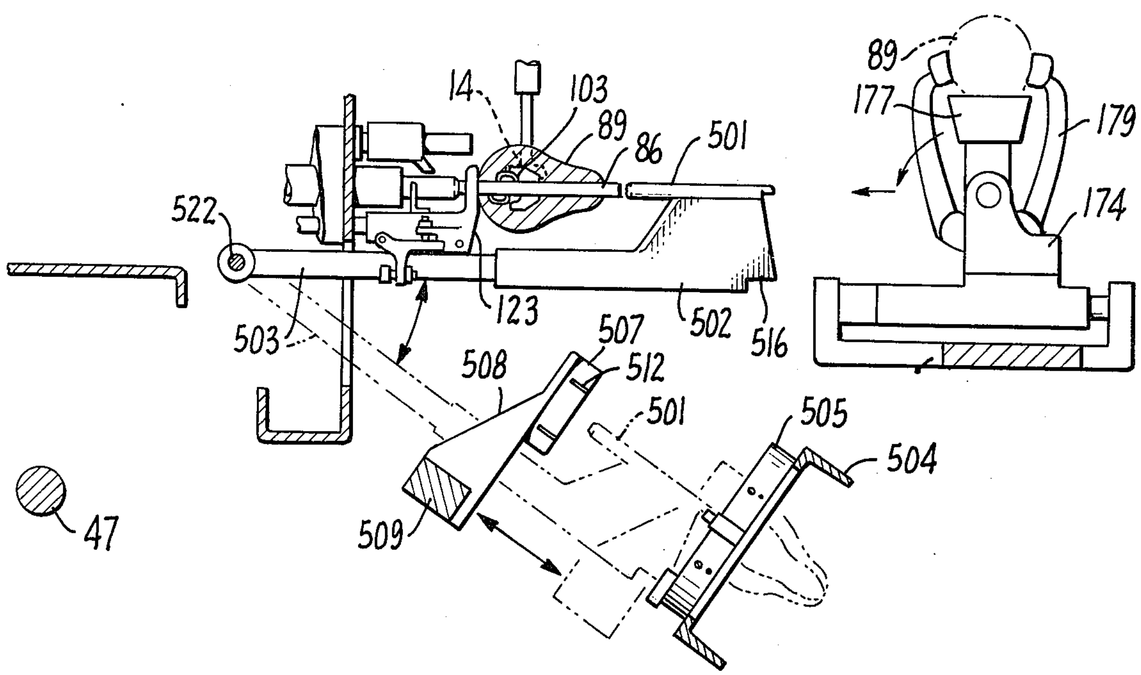
FIG. 1 is a side elevation showing a mechanism embodying the present invention in association with the coring and peeling mechanism as described in the aforesaid U.S. Pat. Nos. 3,055,408 and 3,058,502.

Since the machine of the present invention is an adjunct to the machine shown in the aforementioned U.S. Pat. Nos. 3,055,408 and 3,058,502, the same reference numerals will be used with respect to the same parts as is shown in that patent. Any new or different parts will carry a number beginning with the numeral 500.

The machine includes a plurality of stations, only one of which will be described. Each station includes a spindle 86 carrying a coring knife 103 to core the pear, while the rotating cutter assembly for peeling the pear is designated as 14, the particular cutting knife employed is of the structure shown in U.S. Pat. No. 3,058,502. Each pear to be cored and peeled is positioned in a cup 177, the pear being designated as 89, being held in position in the cup by arms 179. Carriage 174 supporting the cup is addapted to be reciprocated and move the pear forward so that the pear centered in the cup and gripped by fingers 179 will be coaxial with a first spindle 86, as is explained in detail in the aforementioned U.S. Pat. No. 3,055,408. The pear which has been suitably corred and peeled is engaged by block 123 which is effective to move the pear off the spindle 86, as is explained in the aforementioned U.S. Pat. No. 3,055,408. In this machine, however, the movement of the block 123 is effected to transfer the whole cored and peeled pear onto the transfer or second spindle 501 which is supported on blade 502 at the outer end of arm 503, the latter being pivoted upon shaft 522 for movement, for example, between the full line position and the dotted line position shown in FIG. 1. At the forward end of arm 503 is positioned a channel support 504 for the knife assembly, generally designated as 505. This knife assembly includes a plurality of radial knife blades 506, the construction of the knife being further shown and described in detail in FIGS. 27 and 29 in U.S. Pat. No. 3,869,974.

Figure 5:
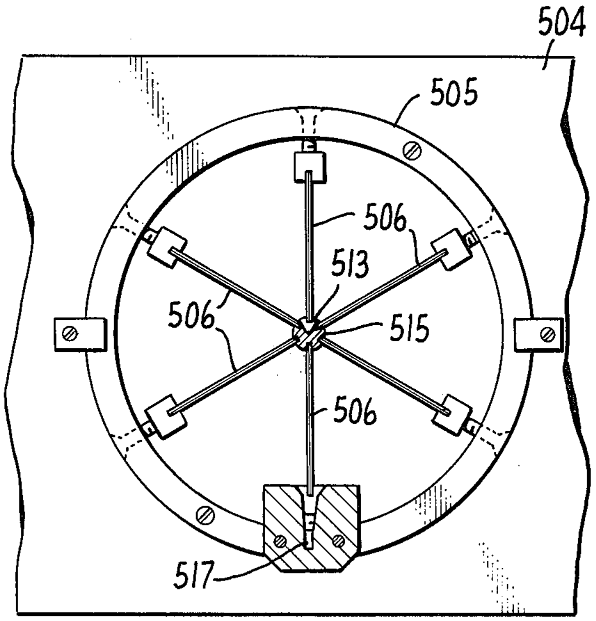
Figure 11:
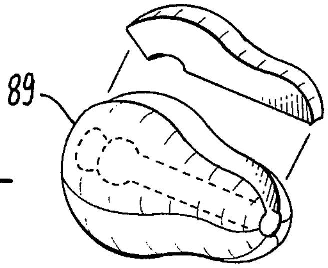
FIG. 11 is a view showing in perspective the pear in segmental form after having been moved through the cutting knife.
Figure 12:
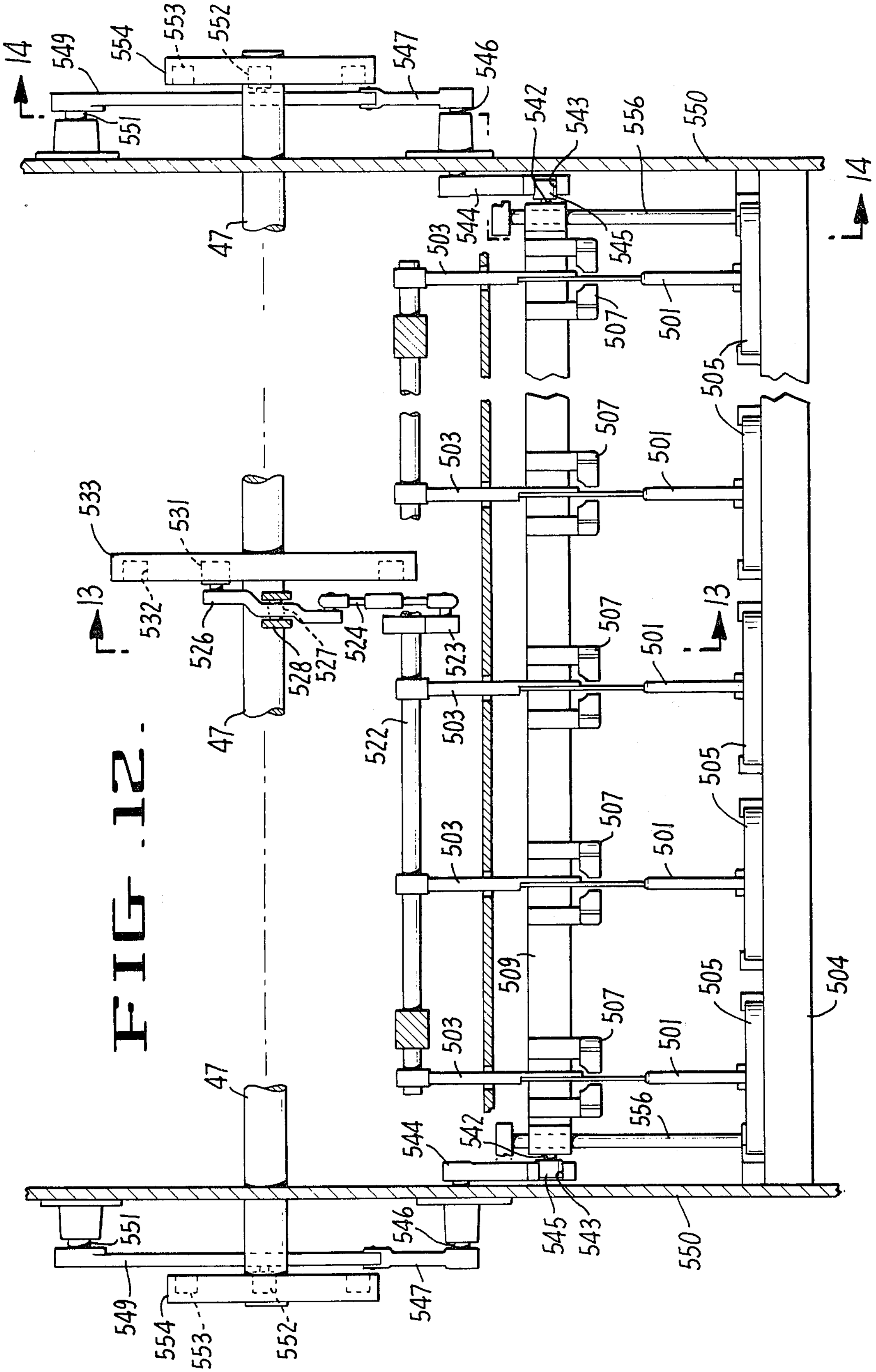
FIG. 12 is a fragmentary plan view of the cams and shafts for effecting the necessary motions.
Figure 16:
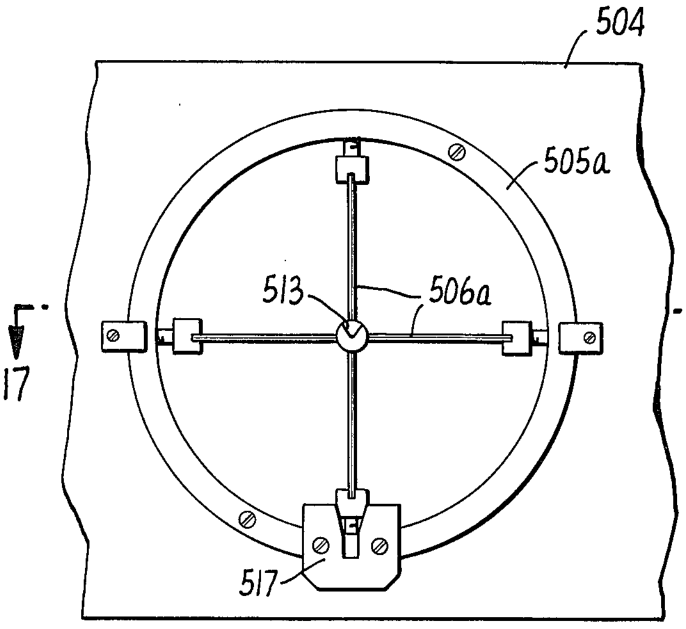
FIG. 16 is a modified from of splitting knife utilized to cut the peeled and cored pear into four segments.
Figure 17:
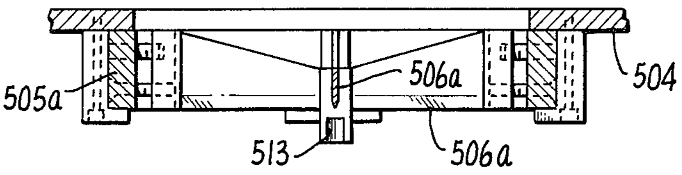
FIG. 17 is a view along the lines 17—17 in FIG. 16.

To force a pear impaled upon spindle 501 into engagement with the knife assembly 505, a pusher element 507 is mounted in axial alignment with circular knife 505. The pusher element 507 is mounted upon a U-shaped block 508 which is in turn mounted upon a transverse support 509. The pusher element includes a slot 510 and an opening 511 permitting it to be intersected by an reciprocated along blade 502 and arm 503. As is indicated by the arrow in FIG. 1, in its downward movement, the pusher element pushes the pear through the knife assembly 505. In the form of knife shown in FIG. 2, six blades are included. Correspondingly the pusher element 507 includes slots or cuts 512 to permit the pear to be pushed completely through the knife and so separated into sections as appears in FIG. 11. In the form of knife 505_a_ and pusher 507_a_ shown in FIGS. 16, 17 and 18, only four blades 506_a_ are provided so that the pear is severed into quarters rather than into sixths as is the case with the knife shown in FIGS. 2, 5 and 6.

The knife blade 506 is attached to hub 515 of the same diameter as spindle 501 and having a recess 513 to receive a complementary projection 514 provided on the end of the spindle 501 so the spindle 501 and the hub 515 are accurately aligned. The alignment of the blade 502 and a knife 506 is further assured by provision of a recess 517 which fits over a projection 516 provided on the underside of the knife 502.

Figure 6:
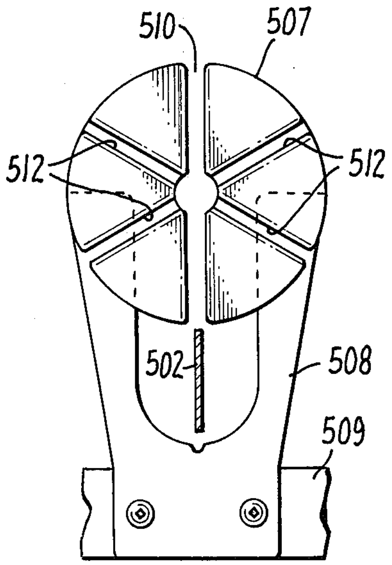
Figure 7:
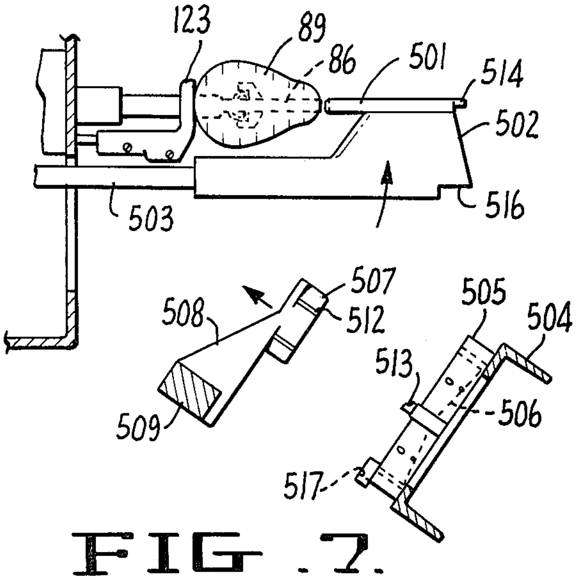
FIG. 7 is a view showing a pear in position and about to be transferred to the auxiliary spindle.
Figure 8:
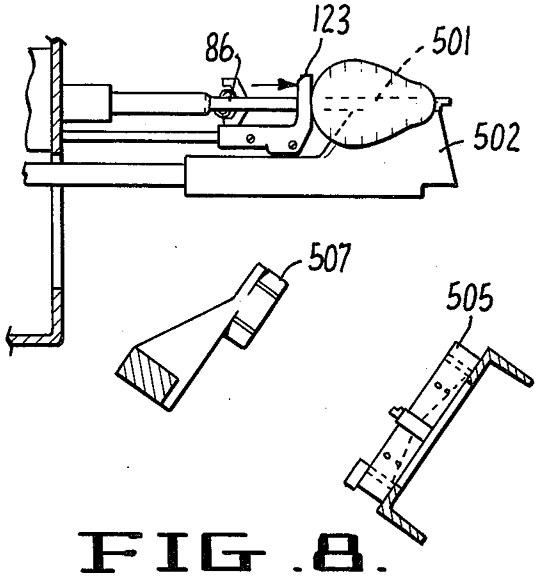
FIG. 8 is a view showing the pear moved from the coring spindle onto the auxiliary spindle.
Figure 9:
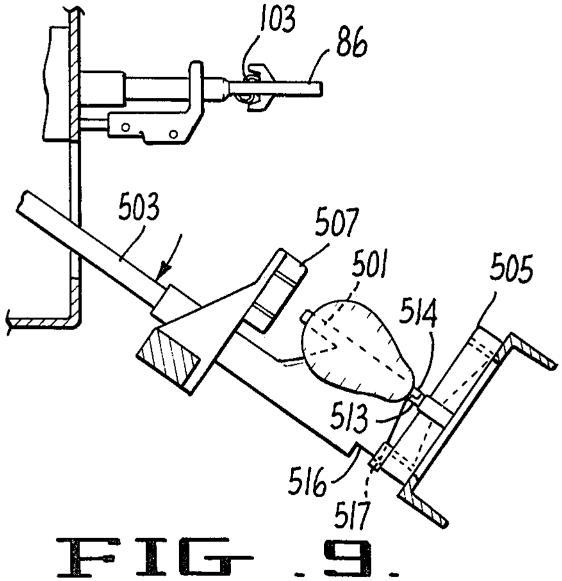
FIG. 9 shows the auxiliary spindle moved into a position in which the pear is in position to be forced through the cutting knife.
Figure 10:
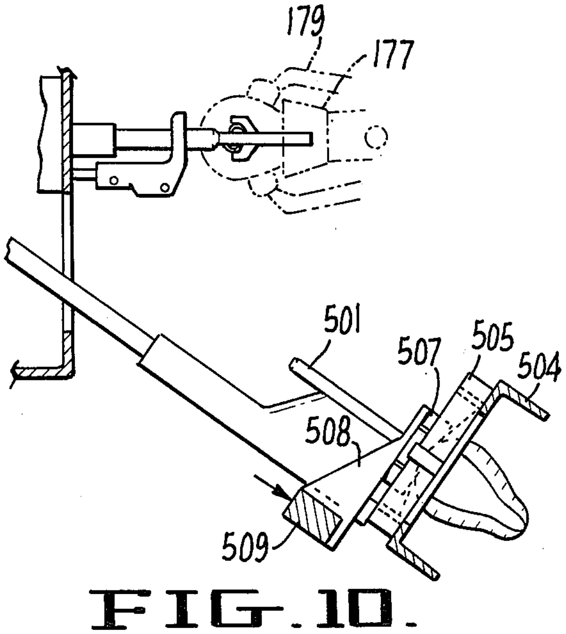
FIG. 10 shows a pear issuing from the splitting knife with another pear in position on the coring spindle.
Figure 18:
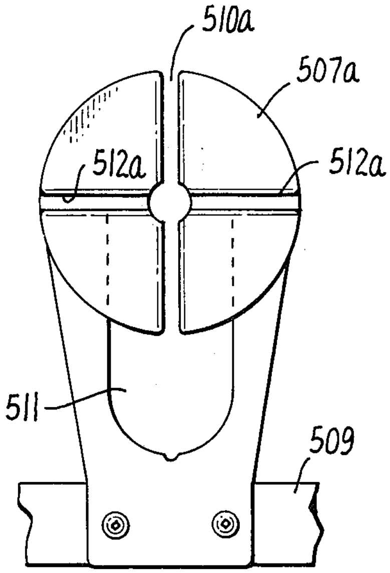
FIG. 18 is a front elevation of the pusher utilized in conjunction with the knife shown in FIG. 16.

Each pusher is made in two similar halves as appears in FIGS. 6 and 18 so that vertical recess 510 is provided through which the spindle support blade 502 can pass from its upper position as appears in the solid lines in FIG. 1 to the lowermost postion shown in dotted lines in FIG. 1.

Figure 2:
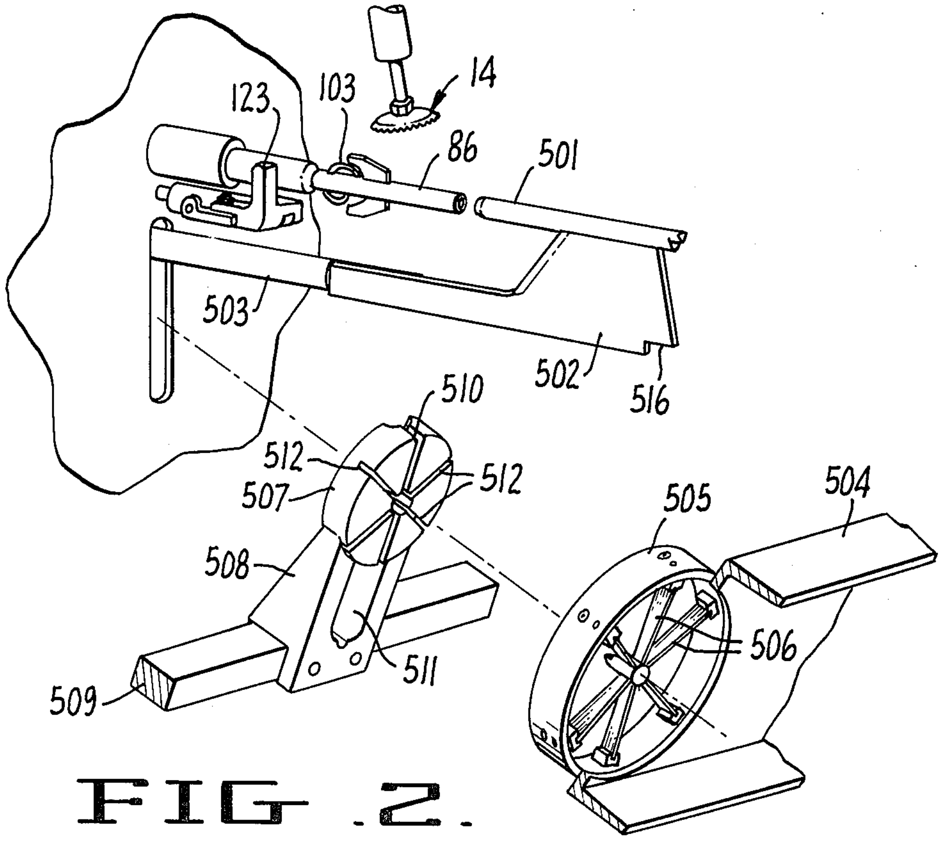
FIG. 2 is a perspective view showing the mechanism in FIG. 1 with the auxiliary support spindle in position to receive a peeled and cored pear from the spindle on which it has been supported while undergoing peeling and coring.
Figure 3:
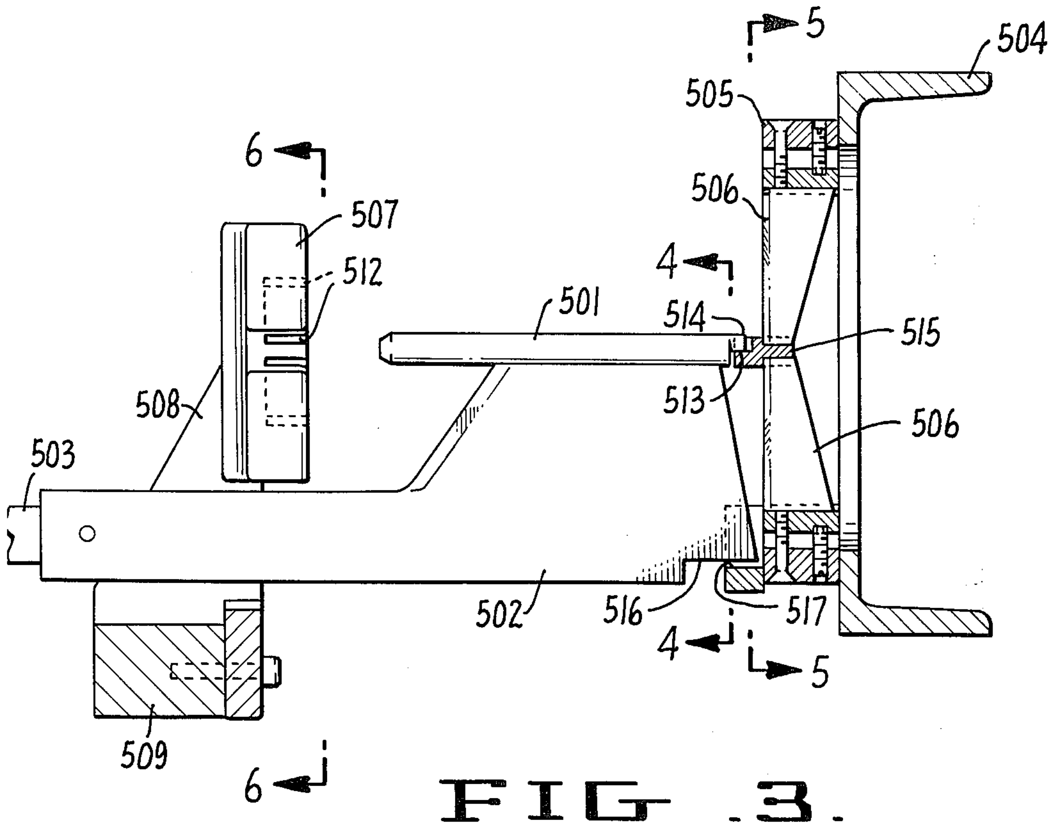
FIG. 3 is a side elevation partly in section showing the auxiliary support spindle in position for supporting a pear for movement through the knife which splits it into multiple portions.
Figure 4:
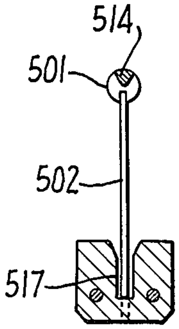
FIGS. 4, 5 and 6 are, respectively, sections taken along the lines 4—4, 5—5 and 6—6 in FIG. 3.

In the form of the pusher shown in FIGS. 2 and 6 as 507, two like opposite halves are provided including two radial slots 60° apart. In the form of pusher 507*a* shown in FIG. 18, vertical recess 510*a* and radial slots 512*a* are provided 90° to one another. If desired, three slots can be provided in each pusher half so that, for example, one can divide a pear into eighths.

Figure 13:
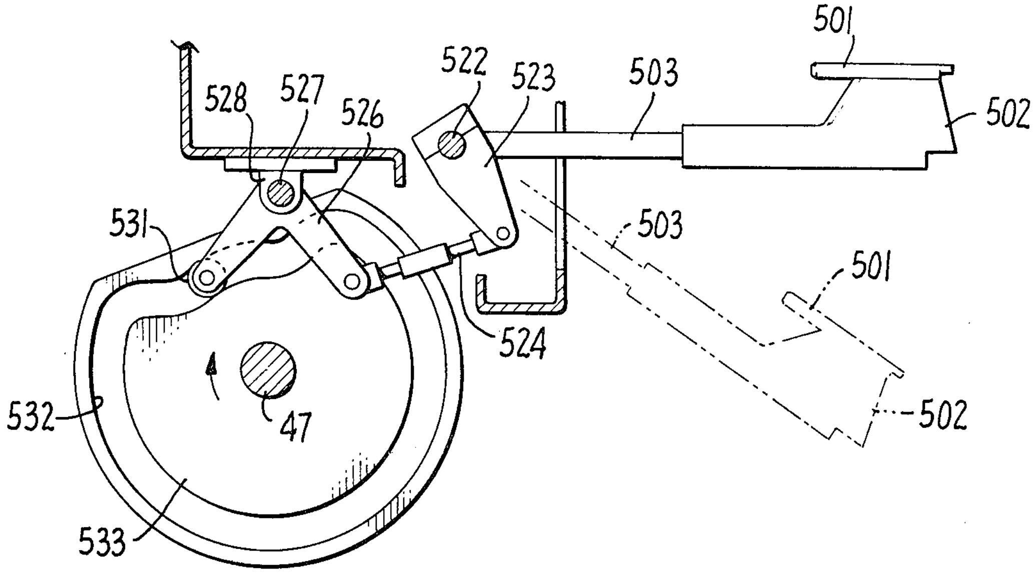
FIG. 13 is a side elevation showing the mechanism utilized for moving the auxiliary spindle from the full line position in which it receives a pear into the dotted line position in which it is in alignment with the splitting knife and taken substantially along the line 13—13 of FIG. 12.

To move the spindle 501 from its uppermost position to its lower position, as these appear in FIG. 1, each arm 503 is joined to a shaft 522 as is shown in FIG. 13. Shaft 522 is oscillated by a leave 523 mounted on shaft 522 and joined by a link 524 to a bell crank 526 which is, in turn, mounted upon shaft 527, the latter being mounted in bearings 528 on the frame of the machine. The opposite arm of bell crank 526 carries a roller 531 moving in track 532 in a box cam 533, the latter bing secured to shaft 47. In this manner, the structure supporting spindle 501 and arm 502 can be moved between the two positions shown in FIG. 1.

Figure 14:
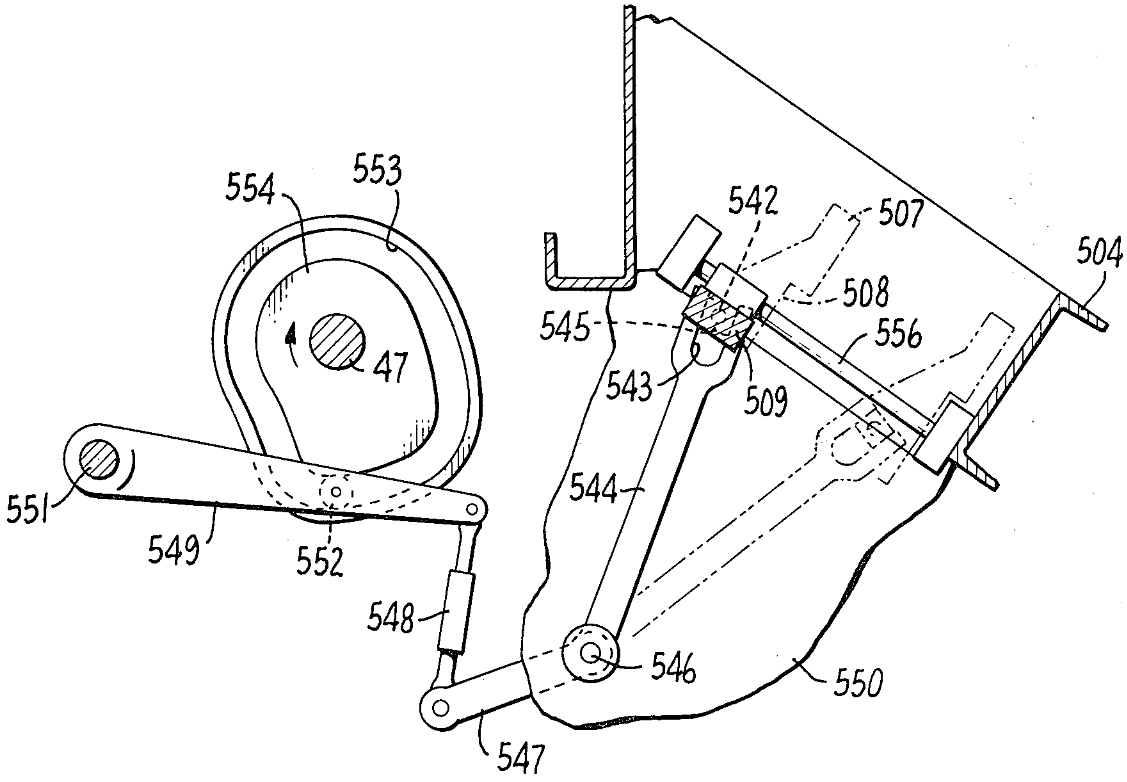
FIG. 14 is a view of the mechanism utilized to move the pusher and force the pear through the splitting knife taken substantially along the line 14—14 of FIG. 12.
Figure 15:
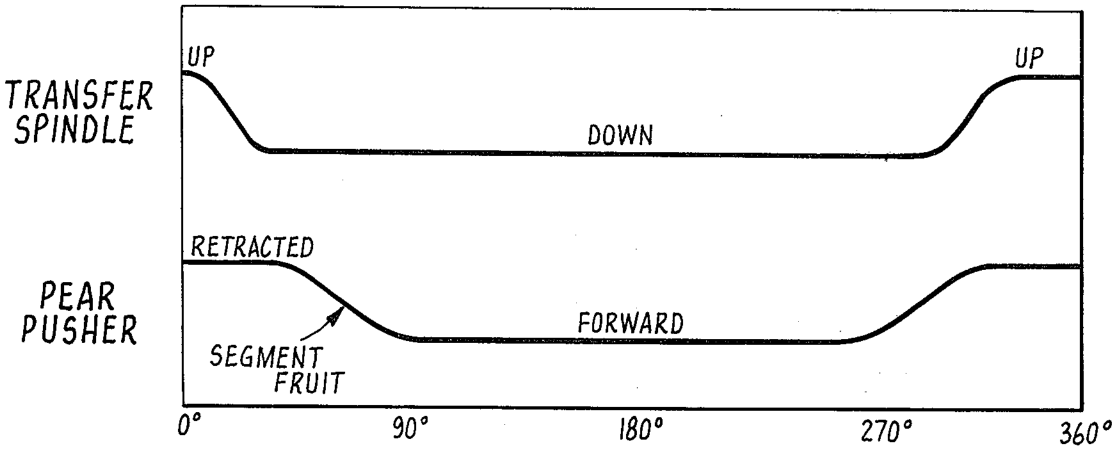
FIG. 15 is a view showing the relative movement of the transfer spindle and pear pusher utilized to transfer the pear from the position shown in FIGS. 7 and 8 into the position shown in FIG. 9 and finally in FIG. 10 as the pear exits from the splitting knife.

To effect the necessary reciprocating motion of the pusher element 507, as indicated by the arrows shown in FIG. 1, the pusher elements 507 are carried on transverse bar 509 which has pins 542 at the ends thereof as shown in FIG. 14. Each pin has a square block 545 pivoted upon it, each block is engaged by a forked end 543 on a lever 544, the latter being mounted on shaft 546 pivoted in the plate 590 which is attached to the pear machine frame. Shaft 546 is in turn oscillated by lever 547 joined to shaft 546 and to a link 548 which extends to a lever 549 mounted upon a shaft 551. Each lever 549 includes a roller 552 riding in track 553 in a box cam 554 mounted on shaft 47. In this manner, the pusher element is move back and forth along the ways 556 between two positions in which, in one position, it is back to receive a pear carried by spindle 501 from in line with the peeling spindle 89 to the lower position with spindle 501 in line with the hub 515 in the knife 505, and the second position in which the pusher element 507 forces the pear on spindle 501 through the knife assembly 505 to cut it into two or more segments depending on the number of radial blades in the knife assembly.

We claim:

1. In a machine wherein a pear is impaled upon a first spindle which serves as a support for the pear during peeling and coring of the pear, a second spindle for receiving a cored and peeled pear from said first spindle, said second spindle being mounted for movement into a first position in which the second spindle is in axial alignment with the first spindle, pushing means for pushing a pear off the first spindle onto the aligned second spindle, a normally stationary circular knife having a plurality of radial knife blades for cutting the pear into segments, said knife spaced from the axis of said first spindle, means for moving the second spindle to a second position in which the second spindle is in alignment with said circular knife, and means for pushing the pear along the second spindle through the circular knife to cut the pear into segments.

2. In a machine as in claim 1 wherein the means for pushing a pear along the second spindle is movable between a first position in which the pushing means is spaced from the knife and second position when the second spindle is in its second position to force a pear on the second spindle through the knife.

3. In a machine as in claim 1 wherein the pushing means is made up of two like halves, the halves being spaced from each other to permit the second spindle to be moved through the space between the separated halves.

4. In a machine as in claim 3 wherein each half of the pushing means has at least one radial cut therein to admit a radial knife blade on the circular knife.

5. In a machine as in claim 3 wherein the knife has at least three radial knife blades and each half of the pushing means has a radial cut permitting the knife blades to pass.

6. In a machine as in claim 3 wherein said second spindle is supported on a spindle support blade and said spindle support blade is moved into alignment with a radial knife blade of the knife when said second spindle is moved into said second position.

7. In a machine as in claim 1 wherein the circular knife has a hub centrally thereof, the hub having a recess in the upper portion of the hub to receive a projection on the second spindle to retain the second spindle in alignment with the centrally positioned hub.

* * * * *